US007974419B2

(12) United States Patent
Tseng

(10) Patent No.: US 7,974,419 B2
(45) Date of Patent: Jul. 5, 2011

(54) POP SOUND PREVENTION MODULE AND SPEAKER APPARATUS THEREOF

(75) Inventor: Shih-Hua Tseng, Taipei (TW)

(73) Assignee: Tatung Company, Taipei (TW)

( * ) Notice: Subject to any disclaimer, the term of this patent is extended or adjusted under 35 U.S.C. 154(b) by 1216 days.

(21) Appl. No.: 11/533,768

(22) Filed: Sep. 21, 2006

(65) Prior Publication Data

US 2008/0008330 A1 Jan. 10, 2008

(30) Foreign Application Priority Data

Jul. 6, 2006 (TW) ............................... 95124638 A

(51) Int. Cl.
*H04B 15/00* (2006.01)

(52) U.S. Cl. ...................................... 381/94.1; 381/94.5

(58) Field of Classification Search ................. 381/94.1, 381/94.5, 59, 55, 120; 330/51, 273, 251, 330/297; 348/632
See application file for complete search history.

(56) References Cited

U.S. PATENT DOCUMENTS 4,956,616 A * 9/1990 Botti ............................. 330/297
5,151,942 A * 9/1992 Sasaki ........................... 381/94.5
7,164,312 B1 * 1/2007 Singh et al. .................. 381/94.5
2006/0251270 A1 * 11/2006 Yang et al. .................... 381/94.5
2007/0064953 A1 * 3/2007 Ishida et al. ..................... 381/55
2007/0121962 A1 * 5/2007 Adachi et al. ................ 381/94.5
2008/0137882 A1 * 6/2008 Tsai et al. .................... 381/94.5

FOREIGN PATENT DOCUMENTS

CN 1619946 5/2005

OTHER PUBLICATIONS

"1st Office Action of China Counterpart Application", issued on Oct. 29, 2010, p. 1-4, in which the listed reference was cited.

* cited by examiner

*Primary Examiner* — Vivian Chin
*Assistant Examiner* — Friedrich Fahnert
(74) *Attorney, Agent, or Firm* — Jianq Chyun IP Office

(57) ABSTRACT

A pop sound prevention module and a speaker apparatus thereof are provided. The pop sound prevention module is used for preventing the speaker apparatus generating a pop sound when a power shuts down. The speaker apparatus includes an audio amplifier, an audio processor, the pop sound prevention module, and a loudspeaker. The audio processor is coupled to a first operation voltage. The audio amplifier is coupled to a second operation voltage. When the power shuts down, the pop sound prevention module outputs a mute control signal to the audio amplifier according to voltage difference between the first operation voltage and the second operation voltage. According to the mute control signal, the audio amplifier prevents the loudspeaker from generating a pop sound.

29 Claims, 3 Drawing Sheets

POP SOUND PREVENTION MODULE AND SPEAKER APPARATUS THEREOF

CROSS-REFERENCE TO RELATED APPLICATION

This application claims the priority benefit of Taiwan application serial no. 95124638, filed on Jul. 6, 2006. All disclosure of the Taiwan application is incorporated herein by reference.

BACKGROUND OF THE INVENTION

1. Field of Invention

The present invention relates to a circuit for preventing the generation of a pop sound. More particularly, when a power shouts down, the present invention relates to a pop sound prevention module for preventing a pop sound generated due to an instant pulse and a speaker apparatus applying the same.

2. Description of Related Art

Conventional speaker apparatuses usually produce a pop sound, such as a sound of "pong", when a power shouts down. When an AC power shuts down, an audio processor of the speaker apparatus is disabled and cannot maintain the mute state of the loudspeaker. Circuits, when the power shuts down, generate abrupt pulses or noises, thus making the loudspeaker producing a pop sound and further damaging the loudspeaker.

Since the conventional speaker apparatuses are not provided with a pop sound prevention circuit design directed to preventing the generation of pop sound, when the power shuts down, the pop sound caused by noises will damage the loudspeaker and reduce the service life of the loudspeaker, and thus customers may lose confidence in the products.

SUMMARY OF THE INVENTION

Accordingly, the present invention is directed to a pop sound prevention module for preventing a speaker apparatus generating a pop sound when a power shuts down. The voltage difference between operation voltages received by the audio processor and the audio amplifier is used to determine the power supply state, and an output corresponding mute control signal is to prevent the loudspeaker from generating a pop sound.

The present invention is also directed to a pop sound prevention method, for preventing the speaker apparatus generating a pop sound when a power shuts down. According to the changes of voltage difference between operation voltages of the speaker apparatus when the power shuts down, a corresponding mute control signal is output to prevent the loudspeaker generating a pop sound.

The present invention is further directed to a speaker apparatus. When the power shuts down, by the use of the changes of operation voltages between the audio processor and the audio amplifier, a corresponding mute control signal is generated to prevent the loudspeaker generating a pop sound.

In order to achieve the aforementioned and other objectives, the present invention provides a pop sound prevention module for preventing a speaker apparatus generating a pop sound when a power shuts down. The speaker apparatus comprises an audio processor coupled to a first operation voltage and an audio amplifier coupled to a second operation voltage. The pop sound prevention module comprises a first resistor being coupled in series with a second resistor between the first operation voltage and a ground end; a first transistor having a control end coupled to a common node of the first resistor and the second resistor; a capacitor being coupled between the first transistor and the ground end; a second transistor, wherein the second transistor is coupled to a third resistor, the other end of the third resistor is coupled to the second operation voltage, and the other end of the second transistor is coupled to the ground end; a fourth resistor being coupled between the control ends of the first transistor and the second transistor; a fifth resistor being coupled between the second operation voltage and the first transistor.

The pop sound prevention module outputs a mute control signal to the audio amplifier via the common node of the second transistor and the third resistor. When the mute control signal is enabled, the output of the audio amplifier is a mute state due to the loudspeaker is in a mute state according to the output of the audio amplifier, thereby avoiding the generation of undesired pop sounds or noises.

In order to achieve the aforementioned and other objectives, the present invention provides a pop sound prevention method for preventing a speaker apparatus generating a pop sound when a power shuts down. The speaker apparatus comprises an audio processor coupled to a first operation voltage and an audio amplifier coupled to a second operation voltage. The method of preventing a pop sound comprises the following steps. First, the first operation voltage and the second operation voltage are detected. Then, a mute control signal is output to the audio amplifier according to the first operation voltage and the second operation voltage. When the first operation voltage is smaller than a predetermined voltage, the mute control signal is enabled, so as to make the output of the audio amplifier be in a mute state. When the first operation voltage is larger than the predetermined voltage, the voltage level of the mute control signal is maintained.

In order to achieve the aforementioned and other objectives, the present invention provides a speaker apparatus, which comprises an audio processor, an audio amplifier, and a pop sound prevention module. The audio processor is coupled to a first operation voltage and outputs an audio signal according to an audio datum. The audio amplifier is coupled to a second operation voltage and the input end of the audio amplifier is coupled to the audio processor, so as to gain the audio signal and output an amplified signal. The pop sound prevention module is coupled to the audio amplifier and outputs a mute control signal to the audio amplifier according to the first operation voltage and the second operation voltage.

When the first operation voltage is smaller than a predetermined voltage, the pop sound prevention module enables the mute control signal, such that the amplified signal of the audio amplifier is a mute state.

In the present invention, a corresponding mute control signal is generated by the changes of operation voltages of the audio amplifier when a power shuts down, thus preventing surges or pulses generated when the power shuts down from making the loudspeaker generating a pop sound, thereby reducing the probability of damaging the loudspeaker and enhancing the quality of the speaker apparatus in use.

In order to make the aforementioned and other objects, features and advantages of the present invention comprehensible, preferred embodiments accompanied with figures are described in detail below.

DESCRIPTION OF EMBODIMENTS

Figure 1:
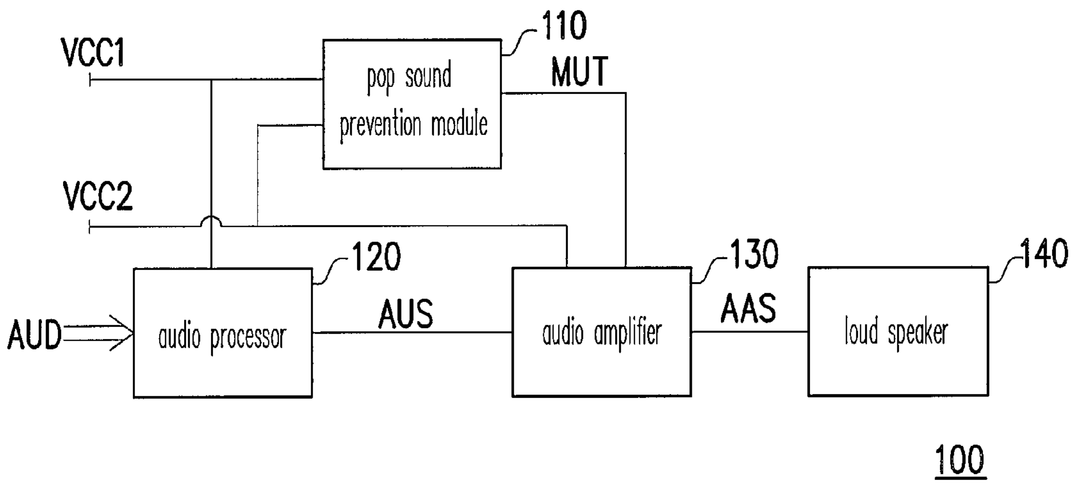
FIG. 1 is a block diagram of the speaker apparatus according to an embodiment of the present invention.

FIG. 1 is a block diagram of the speaker apparatus according to an embodiment of the present invention. A speaker apparatus 100 comprises an audio processor 120, an audio amplifier 130, a loudspeaker 140, and a pop sound prevention module 110. The audio amplifier 130 is coupled between the loudspeaker 140 and the audio processor 120. The pop sound prevention module 110 is coupled to the audio amplifier 130 to output a mute control signal MUT to the audio amplifier 130.

The audio processor 120 receives an audio datum AUD (e.g. digital audio datum), and then converts it into an audio signal AUS (e.g. analog audio signal). After the audio signal AUS is adjusted or gained by the audio amplifier 130, an amplified signal AAS is output through the loudspeaker 140. In the circumstance of normal power supply, the audio processor 120 is coupled to a first operation voltage VCC1 and the audio amplifier 130 is coupled to a second operation voltage VCC2. The first operation voltage VCC1 (e.g. DC voltage of 12v) and the second operation voltage VCC2 (e.g. DC voltage of 5v) are both obtained through the conversion of a power (e.g. AC power of 110v or 220v). Thus, when the power shuts down or is cut off, the first operation voltage VCC1 and the second operation voltage VCC2 are gradually attenuated or decreased. When the power of the speaker apparatus 100 shuts down, the internal signals (for example, the audio datum AUD, audio signal AUS, and amplified signal AAS) may generate unexpected pulses or noises. When the abrupt pulses or noises are too large, the loudspeaker 140 generates a pop sound, such as a sound of "pong".

The pop sound prevention module 110 is coupled to the first operation voltage VCC1 and the second operation voltage VCC2, and outputs the mute control signal MUT to the audio amplifier 130 according to the voltage difference between the first operation voltage VCC1 and the second operation voltage VCC2. When the first operation voltage VCC1 is less than a predetermined voltage, the pop sound prevention module 110 enables the mute control signal MUT, such that the amplified signal AAD output by the audio amplifier 130 is in a mute state. In other words, when the mute control signal MUT is enabled, the audio amplifier 130 keeps the loudspeaker 140 in a mute state, thus avoiding the generation of pop sound. The predetermined voltage can be determined according to various speaker apparatuses 100, such that the pop sound prevention module 110 can enable the mute control signal MUT before the noises are generated. In the embodiment, the predetermined voltage is between the first operation voltage VCC1 and the second operation voltage VCC2, and the first operation voltage VCC1 is greater than the second operation voltage VCC2.

The pop sound prevention module 110 determines whether the power shuts down or is cut off by the use of the voltage difference between the first operation voltage VCC1 and the second operation voltage VCC2. When the power shuts down or is cut off, before the loudspeaker 140 generates the pop sound, the mute control signal MUT is enabled to prevent the loudspeaker 140 generating the pop sound, such as the sound of "pong". In other words, the amplified signal AAS output by the audio amplifier 130 is in a mute state. The mute control signal MUT, when being enabled, is at a logic high level or a logic low level. In the embodiment, the logic low level is taken as an example to illustrate the main technical means of the present invention.

Figure 2:
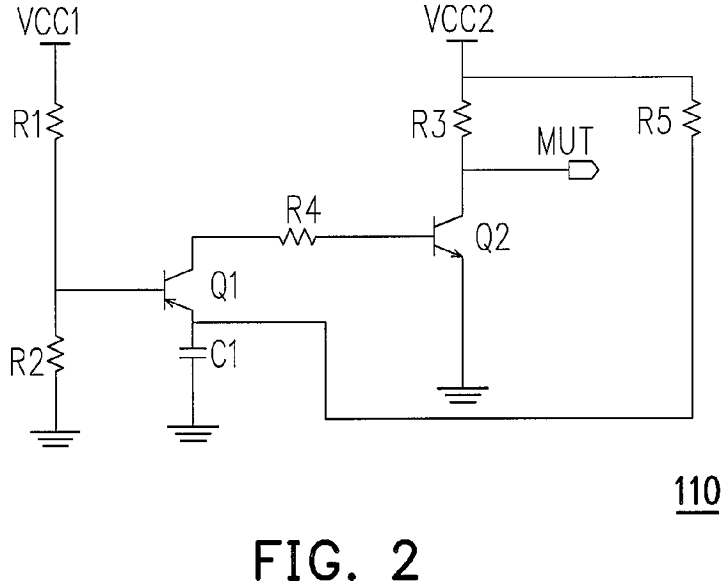
FIG. 2 is a circuit diagram of the pop sound prevention module according to an embodiment of the present invention.

Then, the embodiment of the pop sound prevention module 110 is further illustrated. Referring to FIG. 2, it is a circuit diagram of the pop sound prevention module according to the embodiment of the present invention. The pop sound prevention module 110 comprises resistors R1-R5, transistors Q1, Q2, and a capacitor C1. The transistors Q1, Q2 are both bipolar junction transistors (BJT) in the embodiment, in which the transistor Q1 is a pnp BJT, and the transistor Q2 is an npn BJT.

The circuit structure of the pop sound prevention module 110 is shown in FIG. 2, in which the resistors R1 and R2 are coupled in series between the first operation voltage VCC1 and the ground end GND. The control end (base) of the transistor Q1 is coupled to a common node of the resistors R1 and R2. The capacitor C1 is coupled between an emitter of the transistor Q1 and the ground end GND. The resistor R3 is coupled between the second operation voltage VCC2 and a collector of the transistor Q2, and an emitter of the transistor Q2 is coupled to the ground end GND. The resistor R4 is coupled between a collector of the transistor Q1 and a base of the transistor Q2. The resistor R5 is coupled between the second operation voltage VCC2 and the emitter of the transistor Q1. The pop sound prevention module 110 outputs the mute control signal MUT via a common node of the collector of the transistor Q2 and the resistor R3.

In the circumstance of normal power supply, i.e., when the first operation voltage VCC1 and the second operation voltage VCC2 are stable, the transistors Q1 and Q2 are in OFF state, and the mute control signal MUT is at a logic high level, i.e., in a disabled state. The second operation voltage VCC2 charges the capacitor C1 through the resistor R5. Therefore, in the circumstance of normal power supply, the voltage difference between the two ends of the capacitor C1 is approximately equal to the second operation voltage VCC2, and in the present embodiment, is 5V. The first operation voltage VCC1 determines the control voltage of the base of the transistor Q1 through the voltage division of the resistors R1 and R2. When the power shuts down, the first operation voltage VCC1 decreases, and correspondingly the voltage at the base of the transistor Q1 decrease. However, the voltage at the emitter of the transistor Q1 decreases slowly due to the discharging of the capacitor C1. Therefore, when the first operation voltage VCC1 is less than a predetermined voltage (the predetermined voltage is determined by the proportion of the first resistor R1 to the second resistor R2), the transistor Q1 is turned on and then the transistor Q2 is turned on. When the transistor Q2 is turned on, the mute control signal MUT decreases and then is in an enabled state, thereby preventing the loudspeaker 140 generating the pop sound.

Accordingly, the pop sound prevention module can control the response time of the mute control signal MUT by the adjustment of the proportion of the first resistor R1 to the second resistor R2. When the power shuts down, if the proportion of the resistor R2 is high, the mute control signal MUT is enabled slowly. If the proportion of the resistor R2 is low, the mute control signal MUT is enabled quickly. Definitely, in the circumstance of normal power supply, the proportion of the resistor R1 to the resistor R2 must be a value at which the transistor Q1 is maintained in the OFF state. For example, the voltage difference between the base and the emitter of the transistor Q1 is less than an on-state voltage (e.g. 0.7v). In another aspect, the component value of the resistor R5 and the capacitor C1 can be adjusted to control the discharging speed of the capacitor C1, thereby adjusting the time of converting the mute control signal MUT into the enabled state. The component value of the resistors R1, R2, R5 and the capacitor C1 can be properly adjusted according to various speaker apparatuses 100, so as to improve the effect in preventing the pop sound. Since there are various kinds of speaker apparatuses, those of ordinary skill in the art can deduce the appropriate component parameter value according to the disclosure of the present invention, and the details will not be described herein again.

Figure 3:
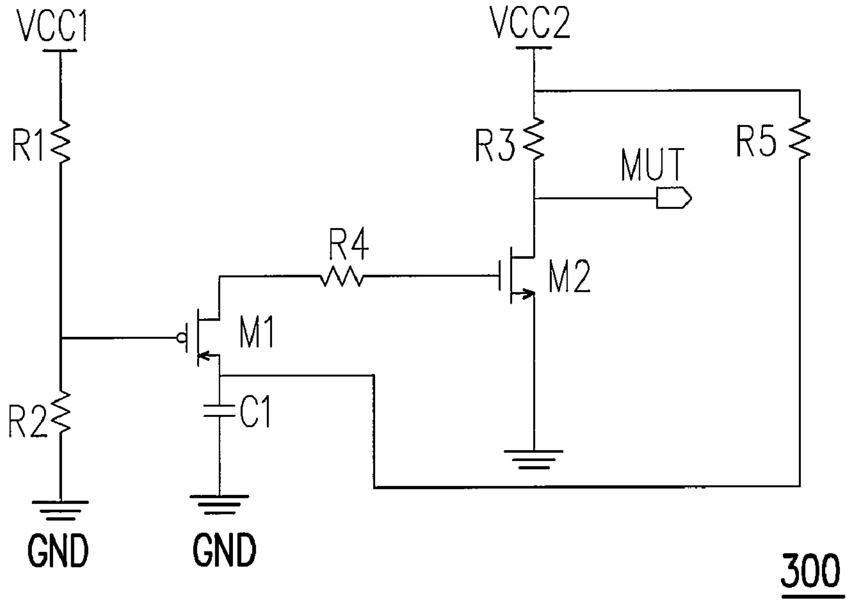
FIG. 3 is a circuit diagram of the pop sound prevention module according to another embodiment of the present invention.

FIG. 3 is a circuit diagram of the pop sound prevention module according to another embodiment of the present invention. FIG. 3 differs from FIG. 2 mainly in the transistors M1 and M2, and other circuit structure can refer to the illustration of FIGS. 3 and 2, which will not be described herein again. In the embodiment of FIG. 3, the transistor M1 is a P channel metal oxide semiconductor transistor (PMOS), and the transistor M2 is an N channel metal oxide semiconductor transistor (NMOS). A pop sound prevention module 300 controls the turning on of the transistor M1 by using the voltage division of the resistors R1 and R2 and the bias voltage of the capacitor C1. When the power shuts down, the first operation voltage VCC1 decreases accordingly. When the first operation voltage VCC1 is less than a predetermined voltage, the pop sound prevention module 300 turns on the transistor M1, and then turns on the transistor M2. When the transistor M2 is turned on, the mute control signal MUT decreases accordingly and is enabled. Other operation details of the embodiment as shown in FIG. 3 is similar to those of FIG. 2, and can be easily deduced by those of ordinary skill in the art according to the disclosure of the present invention, so the details will not be described herein again.

In another embodiment of the present invention, the transistors M1 and M2 can be replaced by transistors of different types, such as a junction field-effect transistor (JFET) of the field effect transistor (FET). The circuit architecture is not limited to the circuit architecture as shown in FIG. 2, it can be any structure capable of determining the power supply state according to the voltage difference between the first operation voltage VCC1 and the second operation voltage VCC2 and then outputs the corresponding mute control signal MUT. The technical means of the present invention is illustrated by another circuit structure below.

Figure 4:
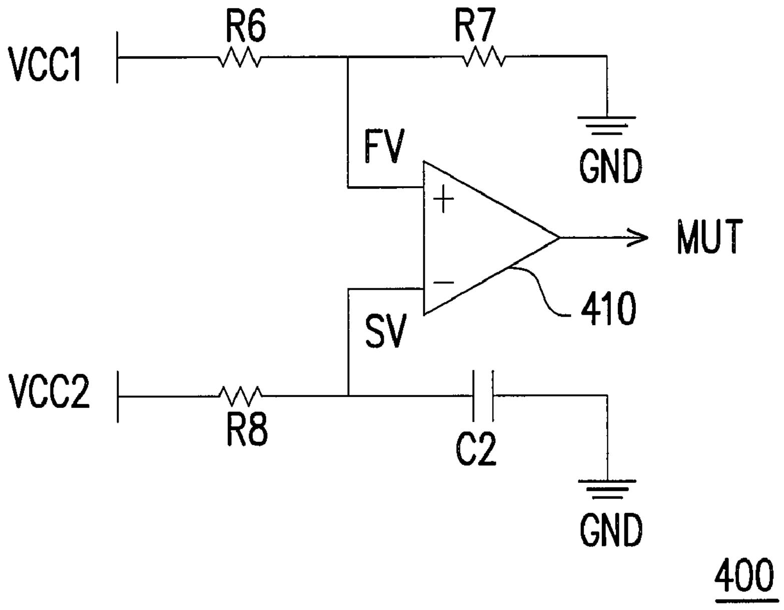
FIG. 4 shows the pop sound prevention module according to another embodiment of the present invention.

FIG. 4 shows the pop sound prevention module according to another embodiment of the present invention. A pop sound prevention module 400 comprises resistors R6-R8, a capacitor C1, and a comparator 410. The resistors R6 and R7 are coupled in series between a first operation voltage VCC1 and a ground end GND, and output a first divided voltage FV to a positive input end of the comparator 410. The resistor R8 and a capacitor C2 are coupled between a second operation voltage VCC2 and the ground end GND, and output a second divided voltage SV to the negative input end of the comparator 410. The comparator 410 outputs the mute control signal MUT to the audio amplifier 130 according to the first divided voltage FV and the second divided voltage SV, thereby preventing the loudspeaker 140 generating a pop sound when the power shuts down.

The first divided voltage FV is determined by the proportion of resistors R6, R7, and the second divided voltage SV is a bias voltage stored in the capacitor C1. In the circumstance of normal power supply, the first divided voltage FV is larger than the second divided voltage SV. When the power shuts down, the first divided voltage FV decreases along with the decrease of the first operation voltage VCC1. When the first divided voltage FV is less than the second divided voltage SV, the comparator 410 outputs the mute control signal MUT with a logic low level, i.e., enabling the mute control signal MUT and preventing the loudspeaker 140 from generating the pop sound.

In the aforementioned embodiment, the mute control signal MUT, when being enabled, is at a logic low level. However, the present invention is not limited to this. In another embodiment of the present invention, only the circuits in FIGS. 2-4 are properly adjusted, for example, adding an inverter to the output end. As such, the mute control signal MUT can be at a logic high level when being enabled, so that various kinds of speaker apparatuses can be applied in the aforementioned embodiments. The details can be easily deduced by those of ordinary skill in the art according to the disclosure of the present invention, and will not be described herein again.

Figure 5:
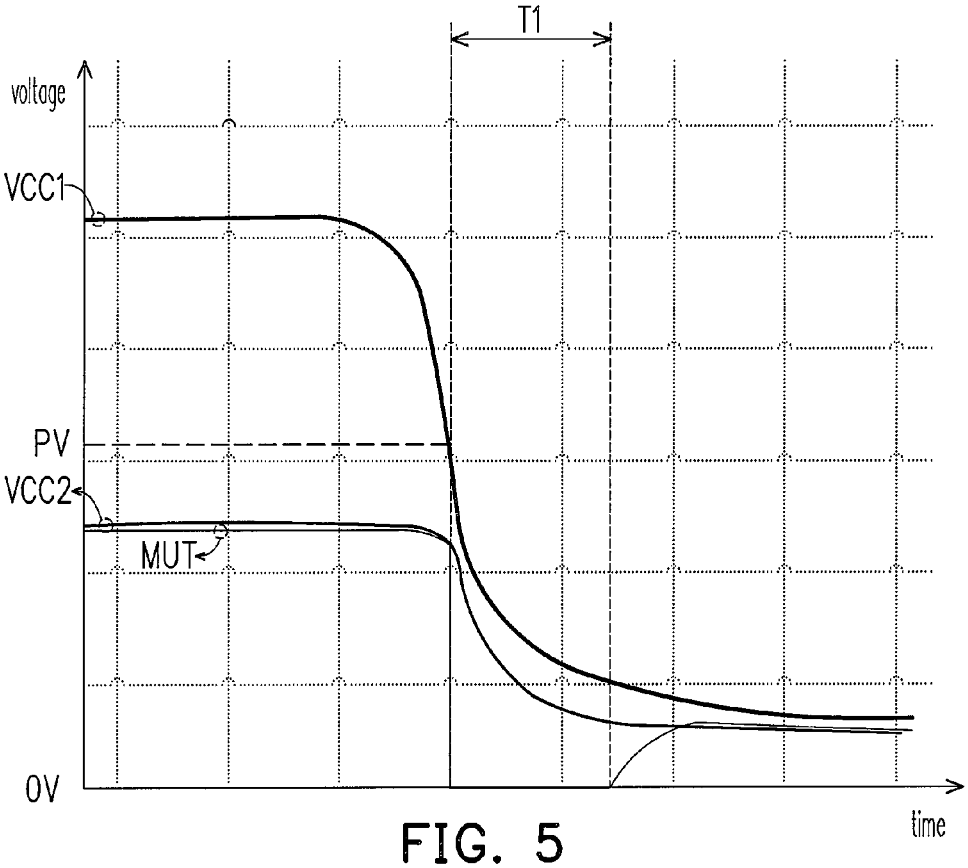
FIG. 5 shows waveforms of the signal according to the embodiments of FIGS. 2 and 3.

FIG. 5 shows waveforms of the signal according to the embodiments of FIGS. 2 and 3. As shown in FIG. 5, in the circumstance of normal power supply, the first operation voltage VCC1 is greater than the second operation voltage VCC2, and the mute control signal MUT is approximately equal to the second operation voltage VCC2, resulting from the resistor R3. When the power shuts down or is cut off and the first operation voltage VCC1 decreases to less than the predetermined voltage PV, the pop sound prevention module enables the mute control signal MUT (i.e. a logic low level in the present invention), as shown in the period T1. In the period T1, the second operation voltage VCC2 decreases along with the discharging of the capacitor C1. After the period T1, the second operation voltage VCC2 decreases to turn off the transistor Q2 or the transistor M2, and then the mute control signal MUT increases according to the first operation voltage VCC1. However, it still maintains a logic low level, and the loudspeaker 140 maintains in the mute state.

Figure 6:
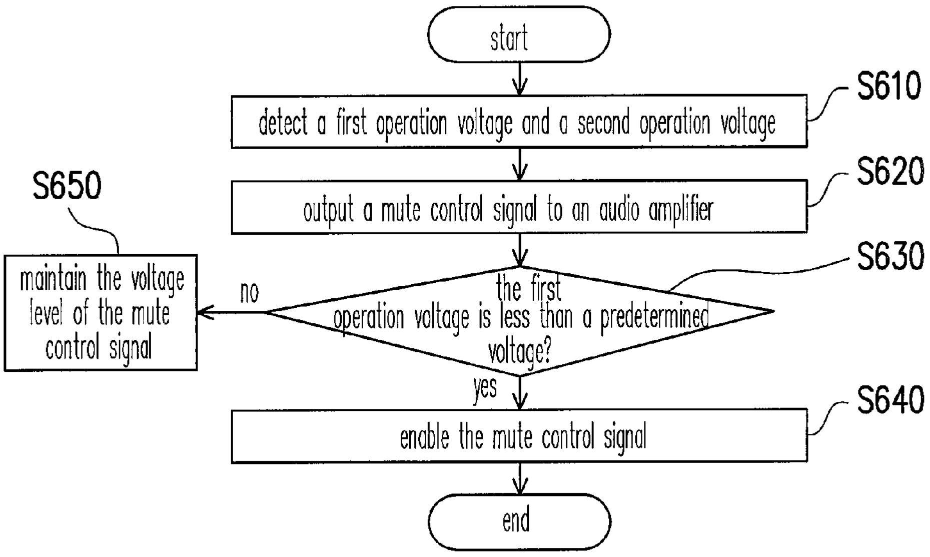
FIG. 6 is a flow chart of the pop sound prevention method according to another embodiment of the present invention.

From another point of view, the present invention further provides a pop sound prevention method, as shown in FIG. 6. Referring to FIGS. 6 and 1 together, FIG. 6 is a flow chart of the pop sound prevention method according to another embodiment of the present invention. The pop sound prevention method of the present embodiment is directed to prevent a speaker apparatus 100 generating the pop sound when the power shuts down. The speaker apparatus 100 comprises an audio processor 120 and an audio amplifier 130. The audio processor 120 is coupled to the first operation voltage VCC1, and the audio amplifier 130 is coupled to the second operation voltage VCC2. The pop sound prevention module 110 outputs a corresponding mute control signal MUT to the audio amplifier 130 according to the first operation voltage VCC1 and the second operation voltage VCC2.

The pop sound prevention method of the present embodiment comprises the following steps. In Step S610, the first operation voltage VCC1 and the second operation voltage VCC2 are detected. In Step S620, the mute control signal MUT is output to the audio amplifier 130 by the pop sound prevention module 110 according to the first operation voltage VCC1 and the second operation voltage VCC2. In Step S630, when the first operation voltage VCC1 is less than a predetermined voltage, proceeding to Step S640, the mute control signal MUT is enabled. When the first operation voltage VCC1 is greater than the predetermined voltage, the voltage level of the mute control signal MUT is maintained.

When the mute control signal MUT is enabled, the amplified signal AAS output by the audio amplifier 130 is in a mute state, thereby preventing the loudspeaker 140 in the speaker apparatus 100 generating the pop sound. The operation details of the pop sound prevention method have been described in the embodiments of FIGS. 1-5 and can be easily deduced by those of ordinary skill in the art according to the disclosure of the present invention, so the details will not be described herein again.

The present invention determines the power supply state by the use of the changes of different operation voltages of the speaker apparatus. When the power shuts down or is cut off, the output of the audio amplifier is adjusted to a mute state, thereby preventing the loudspeaker from generating the undesired pop sound. Therefore, not only the probability of damaging the loudspeaker is reduced, but also the quality of the speaker apparatus in use is enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall: within the scope of the following claims and their equivalents.

What is claimed is:

1. A pop sound prevention module, for preventing a speaker apparatus generating a pop sound when a power shuts down, wherein the speaker apparatus comprises an audio processor coupled to a first operation voltage and an audio amplifier coupled to a second operation voltage, the pop sound prevention module comprising:

a first resistor, being coupled in series with a second resistor between the first operation voltage and a ground end;

a first transistor, a control end of the first transistor being coupled to a common node of the first resistor and the second resistor;

a capacitor, being coupled between a second end of the first transistor and the ground end;

a second transistor, a first end of the second transistor being coupled to a third resistor, the other end of the third resistor being coupled to the second operation voltage, and a second end of the second transistor being coupled to the ground end;

a fourth resistor, being coupled between a first end of the first transistor and a control end of the second transistor; and a fifth resistor, being coupled between the second operation voltage and a second end of the first transistor, wherein the pop sound prevention module outputs a mute control signal to the speaker amplifier via a common node of the first end of the second transistor and the third resistor, and if the mute control signal is enabled, the output of the audio amplifier is a mute state.

2. The pop sound prevention module as claimed in claim 1, wherein the first transistor comprises a pnp bipolar junction transistor, the control end of the first transistor is a base, the first end of the first transistor is a collector, and the second end of the first transistor is an emitter.

3. The pop sound prevention module as claimed in claim 1, wherein the second transistor comprises an npn bipolar junction transistor, the control end of the second transistor is a base, the first end of the second transistor is a collector, and the second end of the second transistor is an emitter.

4. The pop sound prevention module as claimed in claim 1, wherein the first transistor comprises a PMOS transistor, the control end of the first transistor is a gate, the first end of the first transistor is a drain, and the second end of the first transistor is a source.

5. The pop sound prevention module as claimed in claim 1, wherein the second transistor comprises an NMOS transistor, the control end of the second transistor is a gate, the first end of the second transistor is a drain, and the second end of the second transistor is a source.

6. The pop sound prevention module as claimed in claim 1, further comprising a loudspeaker coupled to the audio amplifier, for converting and outputting a signal output by the audio amplifier.

7. The pop sound prevention module as claimed in claim 1, wherein the first operation voltage is greater than the second operation voltage.

8. The pop sound prevention module as claimed in claim 1, wherein when the mute control signal is at a logic low level, the mute control signal is enabled.

9. The pop sound prevention module as claimed in claim 1, wherein when the mute control signal is at a logic high level, the mute control signal is enabled.

10. A pop sound prevention method, for preventing a speaker apparatus generating a pop sound when a power shuts down, wherein the speaker apparatus comprises an audio processor coupled to a first power source operation voltage and an audio amplifier coupled to a second power source operation voltage, the pop sound prevention method comprising:

detecting the first power source operation voltage and the second power source operation voltage, wherein a voltage level of the first power source operation voltage is different from a voltage level of the second power source operation voltage;

outputting a mute control signal to the audio amplifier according to the first power source operation voltage and the second power source operation voltage; and if the first power source operation voltage is less than a predetermined voltage, enabling the mute control signal in response to a means of capacitive discharging so as to make the output of the speaker apparatus be a mute state.

11. The pop sound prevention method as claimed in claim 10, wherein the speaker apparatus further comprises a loudspeaker coupled to the audio amplifier for outputting an amplified signal output by the audio amplifier.

12. The pop sound prevention method as claimed in claim 10, wherein the first power source operation voltage is greater than the second power source operation voltage, and the predetermined voltage is less than the first power source operation voltage and greater than the second power source operation voltage.

13. The pop sound prevention method as claimed in claim 10, wherein when the first power source operation voltage is greater than a predetermined voltage, the voltage level of the mute control signal is maintained.

14. The pop sound prevention method as claimed in claim 10, wherein when the mute control signal is enabled, the mute control signal is at a logic low level.

15. The pop sound prevention method as claimed in claim 10, wherein when the mute control signal is enabled, the mute control signal is at a logic high level.

16. A speaker apparatus, comprising:

an audio processor, being coupled to a first power source operation voltage and outputting an audio signal according to an audio datum;

an audio amplifier, being coupled to a second power source operation voltage, an input end of the audio amplifier being coupled to the audio processor to gain the audio signal and then output an amplified signal; and a pop sound prevention module, being coupled to the audio amplifier and outputting a mute control signal to the audio amplifier according to the first power source operation voltage and the second power source operation voltage, wherein when the first power source operation voltage is less than a predetermined voltage, the pop sound prevention module enables the mute control signal in response to a means of capacitive discharging, so as to make the amplified signal of the audio amplifier be a mute state, wherein a voltage level of the first power source operation voltage is different from a voltage level of the second power source operation voltage.

17. The speaker apparatus as claimed in claim 16, further comprising a loudspeaker coupled to the audio amplifier for converting and outputting the amplified signal.

18. The speaker apparatus as claimed in claim 16, wherein the first power source operation voltage is greater than the second power source operation voltage.

19. The speaker apparatus as claimed in claim 18, wherein the predetermined voltage is less than the first power source operation voltage, and the predetermined voltage is greater than the second power source operation voltage.

20. The speaker apparatus as claimed in claim 16, wherein the pop sound prevention module comprises:

a first resistor, being coupled in series with a second resistor between the first power source operation voltage and a ground end;

a first transistor, a control end of the first transistor being coupled to a common node of the first resistor and the second resistor;

a capacitor, being coupled between a second end of the first transistor and the ground end;

a second transistor, a first end of the second transistor being coupled to one end of a third resistor, the other end of the third resistor being coupled to the second power source operation voltage, and a second end of the second transistor being coupled to the ground end;

a fourth resistor, being coupled between a first end of the first transistor and a control end of the second transistor; and a fifth resistor, being coupled between the second power source operation voltage and a second end of the first transistor, wherein the pop sound prevention module outputs the mute control signal via a common node of the first end of the second transistor and the third resistor, and if the mute control signal is enabled, the output of the audio amplifier is the mute state.

21. The speaker apparatus as claimed in claim 20, wherein the first transistor comprises a pnp bipolar junction transistor, the control end of the first transistor is a base, the first end of the first transistor is a collector, and the second end of the first transistor is an emitter.

22. The speaker apparatus as claimed in claim 20, wherein the second transistor comprises an npn bipolar junction transistor, the control end of the second transistor is a base, the first end of the second transistor is a collector, and the second end of the second transistor is an emitter.

23. The speaker apparatus as claimed in claim 20, wherein the first transistor comprises a PMOS transistor, the control end of the first transistor is a gate, the first end of the first transistor is a drain, and the second end of the first transistor is a source.

24. The speaker apparatus as claimed in claim 20, wherein the second transistor comprises an NMOS transistor, the control end of the second transistor is a gate, the first end of the second transistor is a drain, and the second end of the second transistor is a source.

25. The speaker apparatus as claimed in claim 16, wherein the pop sound prevention module comprises:

a first resistor, being coupled in series with a second resistor between the first power source operation voltage and a ground end, and a common node of the first resistor and the second resistor outputting a first divided voltage;

a third resistor, being coupled in series with a capacitor between the second power source operation voltage and the ground end, and a common node of the third resistor and the capacitor outputting a second divided voltage; and a comparator, comparing the first divided voltage with the second divided voltage, and then accordingly outputting the mute control signal.

26. The speaker apparatus as claimed in claim 25, wherein a positive input end of the comparator is coupled to the common node of the first resistor and the second resistor, and a negative input end of the comparator is coupled to the common node of the third resistor and the capacitor.

27. The speaker apparatus as claimed in claim 25, wherein a negative input end of the comparator is coupled to the common node of the first resistor and the second resistor, and a positive input end of the comparator is coupled to the common node of the third resistor and the capacitor.

28. The speaker apparatus as claimed in claim 16, wherein when the mute control signal is enabled, the mute control signal is at a logic low level.

29. The speaker apparatus as claimed in claim 16, wherein when the mute control signal is enabled, the mute control signal is at a logic high level.

* * * * *